(12) United States Patent
Guo et al.

(10) Patent No.: US 11,494,270 B2
(45) Date of Patent: Nov. 8, 2022

(54) DATA BACKUP METHOD, STORAGE MEDIUM, AND COMPUTING DEVICE

(71) Applicant: TENCENT TECHNOLOGY (SHENZHEN) COMPANY LTD, Guangdong (CN)

(72) Inventors: Rui Guo, Shenzhen (CN); Mao Cai Li, Shenzhen (CN); Zong You Wang, Shenzhen (CN); Hai Tao Tu, Shenzhen (CN); Li Kong, Shenzhen (CN); Kai Ban Zhou, Shenzhen (CN); Chang Qing Yang, Shenzhen (CN); Nan Wang, Shenzhen (CN); Yong Ding, Shenzhen (CN); Yi Fang Shi, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 281 days.

(21) Appl. No.: 17/065,883

(22) Filed: Oct. 8, 2020

(65) Prior Publication Data

US 2021/0026740 A1 Jan. 28, 2021

Related U.S. Application Data

(63) Continuation of application No. PCT/CN2019/108295, filed on Sep. 26, 2019.

(30) Foreign Application Priority Data

Sep. 30, 2018 (CN) .......................... 201811160527.5

(51) Int. Cl.
*G06F 11/10* (2006.01)
*G06F 11/14* (2006.01)
*G06F 16/2455* (2019.01)

(52) U.S. Cl.
CPC ...... *G06F 11/1451* (2013.01); *G06F 16/2455* (2019.01)

(58) Field of Classification Search
None
See application file for complete search history.

(56) References Cited

U.S. PATENT DOCUMENTS

2017/0116693 A1 4/2017 Rae et al.
2018/0144153 A1* 5/2018 Pead .................... G06F 21/6245
(Continued)

FOREIGN PATENT DOCUMENTS

CN 106383754 A 2/2017
CN 106528346 A 3/2017
(Continued)

OTHER PUBLICATIONS

Written Opinion of the International Searching Authority dated Jan. 8, 2020 in International Application No. PCT/CN2019/108295.
(Continued)

*Primary Examiner* — Jau Shya Meng
(74) *Attorney, Agent, or Firm* — Sughrue Mion, PLLC (57) ABSTRACT

A data backup method includes querying a first block of a first blockchain for unused transaction output information based on a first condition being met, the first block including each block of all blocks included in the first blockchain; generating transaction information according to the unused transaction output information obtained based on the querying, the transaction information indicating a transaction operation based on an account address to which the unused transaction output information belongs; recording the transaction information in a second block and releasing the second block, and recording the second block on which a consensus is reached on a second blockchain; and backing up the first blockchain into a storage system, and deleting the
(Continued)

first blockchain. Counterpart apparatus, terminal, server, and/or non-transitory computer-readable medium are also contemplated.

20 Claims, 8 Drawing Sheets

(56) References Cited

U.S. PATENT DOCUMENTS

| | | | |
|---|---|---|---|
| 2018/0152289 A1 | 5/2018 | Hunt et al. | |
| 2018/0189333 A1 | 7/2018 | Childress et al. | |
| 2019/0378139 A1* | 12/2019 | Stribady | G06F 16/245 |
| 2019/0379754 A1* | 12/2019 | Krishnaswamy | G06F 16/1805 |
| 2020/0052884 A1* | 2/2020 | Tong | H04L 9/3247 |

FOREIGN PATENT DOCUMENTS

| | | |
|---|---|---|
| CN | 106713412 A | 5/2017 |
| CN | 106919476 A | 7/2017 |
| CN | 109299336 A | 2/2019 |

OTHER PUBLICATIONS

Extended European Search Report dated Jul. 26, 2021 in European Application No. 19867203.2.
Andreas M. Antonopoulos, "Mastering Bitcoin", Unlocking Digital Crypto-Currencies, Dec. 31, 2014, pp. 1-282, Retrieved from: URL:https://unglueitfiles.s3.amazonaws.com/ebf/05db7df4f31840f0a873d6ea14dcc28d.pdf (282 pages).
International Search Report for PCT/CN2019/108295 dated Jan. 8, 2020 [PCT/ISA/210].

* cited by examiner

S301: Query a first block in a first blockchain to obtain unused transaction output information in a case that a first condition is met S302: Generate transaction information according to the unused transaction output information obtained by query, the transaction information being used for describing a transaction operation that does not change an account address to which the unused transaction output information belongs S303: Record the generated transaction information in a second block and release the second block, and record the second block on which a consensus is reached on a second blockchain; and save the first blockchain into a storage system, and delete the first blockchain

DATA BACKUP METHOD, STORAGE MEDIUM, AND COMPUTING DEVICE

CROSS-REFERENCE TO RELATED APPLICATION(S)

This application is a bypass continuation application of International Application No. PCT/CN2019/108295, filed on Sep. 26, 2019, which claims priority to Chinese Patent Application No. 201811160527.5, entitled "DATA BACKUP METHOD, STORAGE MEDIUM, AND COMPUTING DEVICE" and filed with the China National Intellectual Property Administration on Sep. 30, 2018, the disclosures of which are herein incorporated by reference in their entireties.

FIELD

The disclosure relates to the field of computer technologies, and in particular, to a data backup method, a storage medium, and a computing device.

BACKGROUND

The blockchain technology (BT), also referred to as a distributed ledger technology, is an Internet database technology characterized by decentralization, openness, and transparency, to allow for every user's participation in database recording. The blockchain technology is originally a basic technology for implementing bitcoin transactions, and has been applied to various fields such as finance. Because each node device in a blockchain stores all data on the entire blockchain, a large amount of storage space is occupied and performance of a blockchain system is affected.

SUMMARY

One or more example embodiments of the disclosure provide the following technical solutions, that save storage space of a blockchain node and improve performance of a blockchain system.

According to an aspect of an example embodiment, a data backup method performed by a terminal is provided. The method includes: querying a first block of a first blockchain for unused transaction output information based on a first condition being met, the first block including each block of all blocks included in the first blockchain; generating transaction information according to the unused transaction output information obtained based on the querying, the transaction information indicating a transaction operation based on an account address to which the unused transaction output information belongs; recording the transaction information in a second block and releasing the second block, and recording the second block on which a consensus is reached on a second blockchain; and backing up the first blockchain into a storage system, and deleting the first blockchain.

The first condition may include a condition that a block height of the first blockchain reaches a preset value.

The first condition may include at least one of a condition that a remaining storage space is lower than a first threshold, a condition that a set time interval is reached, or a condition that a set operation instruction is received.

A block height of the second block may correspond to a block height of a last block in the first blockchain.

A block header eigenvalue of a parent block included in the second block may be a block header eigenvalue of a last block in the first blockchain.

The backing up may include recording, in a data backup table, identification information of each block in the first blockchain and a storage address of each block in the storage system.

The method may further include, after the first blockchain is deleted, querying the data backup table for a storage address corresponding to identification information of a block included in the first blockchain, and accessing the block in the storage system according to the storage address.

According to an aspect of an example embodiment, a non-transitory computer-readable storage medium storing instructions is provided. The instructions, when executed by one or more processors, cause at least one of the one or more processors to perform: querying a first block of a first blockchain for unused transaction output information based on a first condition being met, the first block including each block of all blocks included in the first blockchain; generating transaction information according to the unused transaction output information obtained based on the querying, the transaction information indicating a transaction operation based on an account address to which the unused transaction output information belongs; recording the transaction information in a second block and releasing the second block, and recording the second block on which a consensus is reached on a second blockchain; and backing up the first blockchain into a storage system, and deleting the first blockchain.

The first condition may include at least one of a condition that a block height of the first blockchain reaches a preset value; a condition that a remaining storage space is lower than a first threshold; a condition that a set time interval is reached; or a condition that a set operation instruction is received.

A block height of the second block may correspond to a block height of a last block in the first blockchain.

A block header eigenvalue of a parent block included in the second block may be a block header eigenvalue of a last block in the first blockchain.

The instructions may be configured to cause at least one of the one or more processors to perform the backing up by recording, in a data backup table, identification information of each block in the first blockchain and a storage address of each block in the storage system.

The instructions may be further configured to cause at least one of the one or more processors to perform, after the first blockchain is deleted, querying the data backup table for a storage address corresponding to identification information of a block included in the first blockchain, and accessing the block in the storage system according to the storage address.

According to an aspect of an example embodiment, a computing device is provided, including: at least one memory configured to store program code; and at least one processor configured to read the program code and operate as instructed by the program code. The program code includes: first querying code configured to cause at least one of the at least one processor to query a first block of a first blockchain for unused transaction output information based on a first condition being met, the first block including each block of all blocks included in the first blockchain; generating code configured to cause at least one of the at least one processor to generate transaction information according to the unused transaction output information obtained based on querying of the first querying code, the transaction information indicating a transaction operation based on an account address to which the unused transaction output information belongs; first recording code configured to cause at least one of the at least one processor to record the transaction information in a second block and releasing the second block, and recording the second block on which a consensus is reached on a second blockchain; and backup code configured to cause at least one of the at least one processor to back up the first blockchain into a storage system, and deleting the first blockchain.

The first condition may include a condition that a block height of the first blockchain reaches a preset value.

The first condition may include at least one of a condition that remaining storage space is lower than a first threshold, a condition that a set time interval is reached; or a condition that a set operation instruction is received.

A block height of the second block may correspond to a block height of a last block in the first blockchain.

A block header eigenvalue of a parent block included in the second block may be a block header eigenvalue of a last block in the first blockchain.

The program code may further include second recording code configured to cause at least one of the at least one processor to record, in a data backup table, identification information of each block in the first blockchain and a storage address of each block in the storage system.

The program code may further include second querying code configured to cause at least one of the at least one processor to, after the first blockchain is deleted, query the data backup table for a storage address corresponding to identification information of a block included in the first blockchain, and access the block in the storage system according to the storage address.

BRIEF DESCRIPTION OF THE DRAWINGS

To describe the technical solutions in the example embodiments of the disclosure more clearly, the following briefly introduces the accompanying drawings for describing the example embodiments. The accompanying drawings in the following description show merely some embodiments of the disclosure, and a person of ordinary skill in the art may still derive other drawings and/or embodiments from accompanying drawings without creative efforts.

DETAILED DESCRIPTION

For brief and intuitive description, the following describes the solutions of the disclosure by describing several example embodiments. However, not all embodiments are shown herein. The details in the embodiments are for helping better understanding of the solutions of the disclosure. Implementation of the technical solutions of the disclosure is not limited to these details. To avoid obscuring the solutions of the disclosure, some implementations are not described in detail, but only a framework is provided. In the following text, "include" refers to "include but not limited to", and "according to . . . " refers to "according to at least . . . , but not being limited to "only according to . . . ". The "include/comprise" in the specification and claims means to include at least to some extent, and it is to be interpreted as besides including features mentioned later, other features may also exist.

Figure 1:
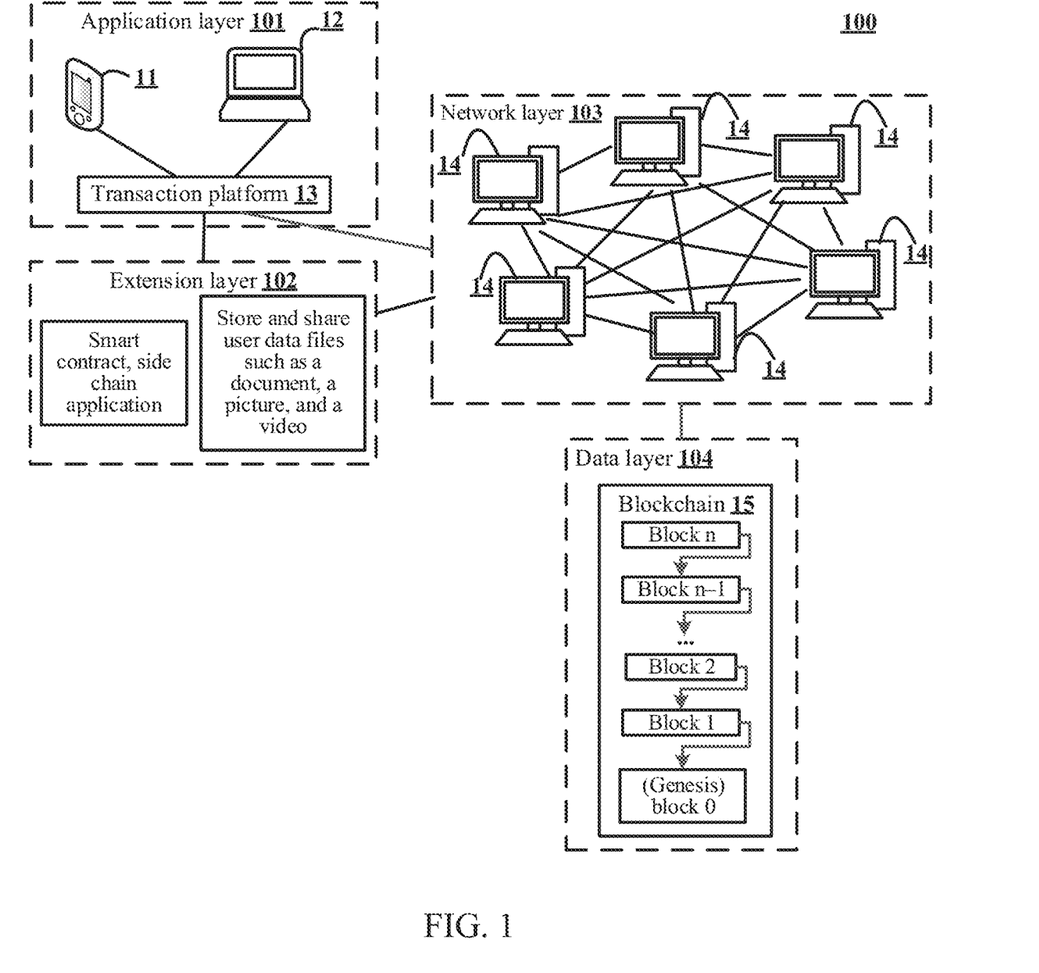
FIG. 1 is a diagram of a system architecture according to an embodiment of the disclosure.

The disclosure provides a data backup method. The method may be applied to a blockchain system 100 shown in FIG. 1. As shown in FIG. 1, the blockchain system 100 includes at least an application layer 101, a network layer 103, and a data layer 104, and may further include an extension layer 102. The application layer 101 provides application clients 11 and 12 (such as a wallet client for digital asset transactions) and a transaction platform 13 for users. The application clients 11 and 12 run on terminal devices.

The terminal devices may include: a personal computer (PC), a mobile phone, a tablet computer, a palmtop computer, an ultrabook, a wearable device, and the like. The users may log in to the transaction platform 13 to complete transaction operations such as a digital asset transaction and a shared ledger review by operating user interface (UIs) provided by the application clients 11 and 12.

The transaction platform 13 may include a server or a server cluster, or may further include a distributed system. The extension layer 102 provides some extended application service functions, which include side chain applications such as a smart contract, and may further include functions of storing and sharing user data files such as a text, a picture, and a video. The users may implement functions such as smart contract signing and data file storage and sharing through the extension layer 102 by operating the UIs provided by the application clients 11 and 12. The network layer 103 includes a plurality of blockchain nodes 14 distributed in different regions. The nodes 14 constitute a blockchain network. Each node 14 may be a computing device with a point-to-point communication function, such as a desktop computer, a laptop computer, or a tablet computer. The blockchain nodes 14 constitute a peer-to-peer (P2P) network, and each node 14 stores complete data of a blockchain 15. The network layer 103 is configured to implement communication between the nodes 14, and encapsulates a P2P networking mechanism, a data transmission mechanism, a verification mechanism, and the like between the nodes 14.

The blockchain network is essentially a P2P network. Each node 14 receives and generates information, and a common blockchain is maintained between the nodes 14 to keep communication. In a blockchain network, each node 14 may create a new block. After the new block is created, another node is notified through broadcast, and verifies the block. After verified by the node, the new block may be added to the blockchain. The data layer 104 encapsulates a data structure of the blockchain 15. As shown in FIG. 1, the blockchain 15 is formed by linking a plurality of blocks (a block 0 to a block n). The first created block 0 is a "genesis block", and then blocks with the same data structure created according to a rule are connected in sequence through a chain structure to form a main chain. With an increasingly long running time, new blocks are continuously added to the main chain after being verified, and the main chain becomes longer and longer.

FIG. 1 shows a part of the blockchain system 100. In an example implementation, there may be a consensus layer, an incentive layer, and the like above the network layer 103. The consensus layer encapsulates a consensus mechanism so that highly dispersed nodes 14 may efficiently reach a consensus on the validity of block data in a decentralized system, that is, an agreement is made on how to reach a consensus among all the nodes 14 to identify validity of a transaction record set, which is used for identification and preventing tampering. Commonly used consensus mechanisms mainly include: proof of work, proof of stake, and delegated proof of stake.

In the blockchain system, data is permanently recorded in the form of files. The files may be referred to as blocks. A block may include a set of transaction records that occur within a period of time, and the transaction record set is not recorded by a previous block, and each block records events that occur before the block is created. Created blocks are linked in sequence, and generally a new block is added to an end of a blockchain and linked to a previous block. A transaction represents an operation in a transaction system by a user. Whenever a change in a state of a ledger is caused, a record is added to the ledger. A block records transactions that occur within a period of time and state results, which is a consensus on the state of the current ledger. A chain is formed by serially connecting blocks in a sequence of creation times, and is a log record of changes in the state of the entire ledger.

Figure 2:
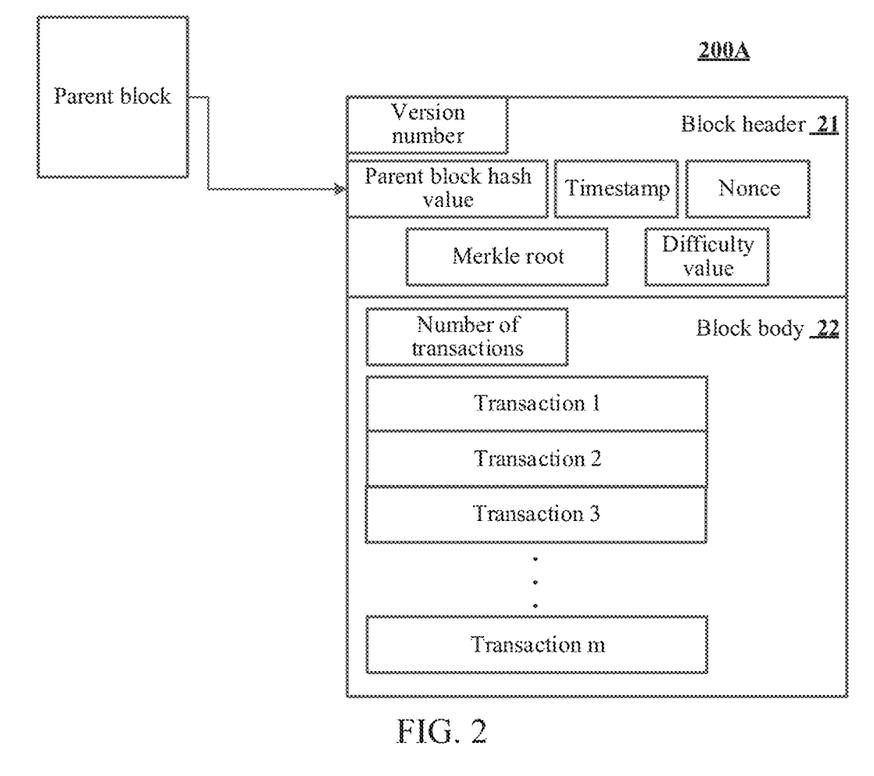
FIG. 2 is a diagram of a data structure of a block according to an embodiment of the disclosure.

The block is a data structure recording transactions. Each block includes a block header and a block body. The block body is responsible for recording transaction information within a previous period of time, and the block header records information used for linking to a parent block, mining competition, and transaction data verification. FIG. 2 shows a data structure of a block 200A. As shown in FIG. 2, the block 200A includes a block header 21 and a block body 22. The block body 22 records the number of transactions and information of a plurality of transactions that occur within a period of time, such as transaction information of a transaction 1, a transaction 2, . . . , and a transaction m. The block header 21 records the following information fields:

1. a version number used for identifying relevant version information of software and a protocol;

2. a parent block hash value, which is a block header hash value of a parent block of the block 200A, enables blocks to be connected end to end to form a blockchain, and plays a vital role in the security of the blockchain;

3. a Merkle root, which is a value calculated from hash values of all transaction information in the block body 22 hashed two by two, and is mainly used for verifying whether a transaction exists in this block;

4. a timestamp recording a time when the block 200A is created, precise to the second;

5. a difficulty value, which is a difficulty target value of a math problem related to the block 200A; and 6. a nonce recording a value of the answer to the math problem related to the block 200A.

After the block 200A is added to the blockchain, all miners (blockchain nodes 14) begin to generate a next block, including:

1. recording transaction information in a local memory into a block body;

2. generating, in the block body, a Merkle tree of all transaction information in the block, and saving a value of a Merkle tree root (that is, a Merkle root) in a block header;

3. generating a hash value through a SHA256 algorithm by using data of the block header of the block 200A recently added to the blockchain, and filling the hash value into a parent block hash value of the current block;

4. saving a current time in a timestamp field; and 5. adjusting a difficulty value field according to an average generation time of blocks in a previous period of time to adapt to a total constantly changing calculation amount of the entire network. If the total calculation amount increases, the system increases the difficulty value of the math problem so that a time to complete the next block is still within a certain period of time.

A block header hash value may uniquely identify a block, and any node 14 may independently obtain the block header hash value by performing a hash calculation on the block header. The block header hash value is not actually included in a data structure of the block. The block header hash value is calculated by a node 14 when the node 14 receives the block from the blockchain network. The block header hash value may be stored in an independent database table as a part of block metadata, for easy indexing and faster retrieval of a block from a magnetic disk. In addition, the block further has a block height in the blockchain, which may be used for identifying a position of the block in the blockchain. A block height of the first block (that is, the genesis block) is 0, a height of a block referencing the genesis block is 1, and so on. Each block stored in the blockchain later has a position 1 "higher" than that of a previous block, and its block height value is equal to a block height value of the previous block plus 1. Different from the block header hash value, the block height is not a unique identifier of the block. Two or more blocks may have the same block height and contend for the same position in the blockchain. The block height is not a part of the data structure of the block either, and is not stored in the block. When receiving a block from the blockchain network, the node 14 dynamically identifies a position (that is, a block height) of the block in the blockchain. The block height may also be stored as metadata in an indexed database table for quick retrieval.

Figure 3:
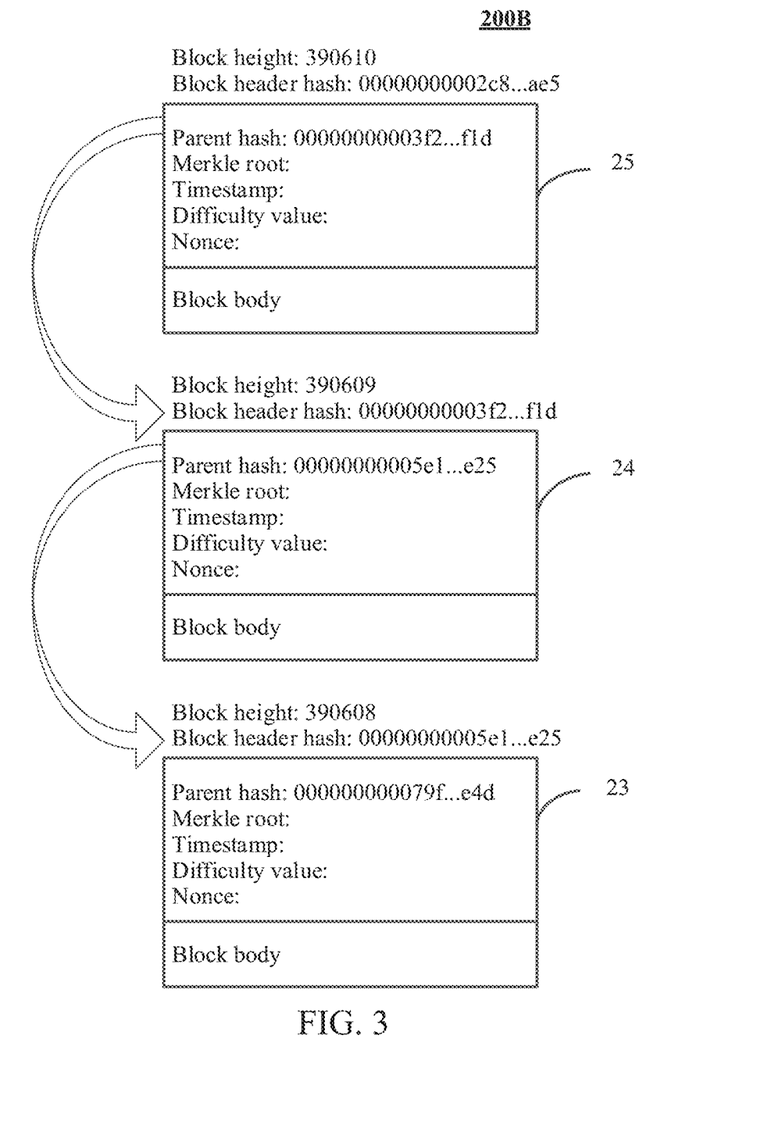
FIG. 3 is a schematic partial diagram of a blockchain according to an embodiment of the disclosure.

FIG. 3 shows a schematic partial diagram of a blockchain according to an embodiment of the disclosure. FIG. 3 shows three blocks 23, 24, and 25 included in a partial blockchain 200B. A block height and a block header hash value of each block are not recorded inside the block, but a link relationship between the blocks is determined. The block height and the block header hash value of each block may be stored in a blockchain metadata table in a local database of the node 14.

However, with the increasing number of blocks in the blockchain, storage pressure on a single node 14 is also increasing, which poses higher requirements on a stand-alone device that runs the node 14.

Figure 4:
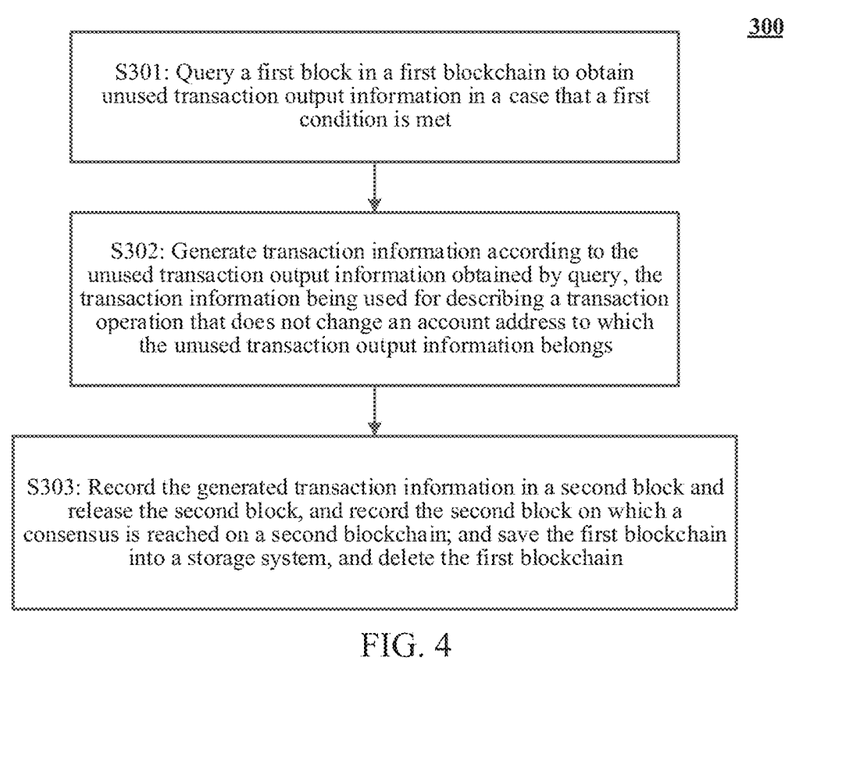
FIG. 4 is a flowchart of a method according to an embodiment of the disclosure.

In the embodiments of the disclosure, a data backup method is provided. The method may be applied to the node 14 to automatically back up some blocks, thereby reducing the storage pressure of the node 14. FIG. 4 is a flowchart of a method according to an embodiment of the disclosure. As shown in FIG. 4, the method 300 starts with operation S301.

In operation S301, the node 14 queries a first block in a first blockchain to obtain unused transaction output information in a case that a set first condition is met. Herein, the first block includes all blocks in the first blockchain. In other words, the node 14 queries each block in the first blockchain to obtain unused transaction output information, to obtain all unused transaction output information.

The first condition is equivalent to a start condition of a data backup process provided in an embodiment of the disclosure. In some embodiments, the first condition may include at least one of the following: a set time interval is reached, a block height of the first blockchain conforms to a preset value, remaining storage space is lower than a threshold, a set operation instruction is received, and the like.

When the first condition includes that a set time interval is reached, the node 14 may start a data backup process at a specific interval (such as one day or one month), or start data backup processes respectively at a plurality of set time points (such as the first month, the third month, and the sixth month from a founding time of the first blockchain). A specific setting method of the time interval is not limited in the disclosure.

When the first condition includes that a block height of the first blockchain reaches a preset value, the node 14 may start a data backup process when the block height of the first blockchain reaches the preset value. A specific setting method of the preset value is not limited in the disclosure.

When the first condition includes that remaining storage space is lower than a threshold, the node 14 may start a data backup process when there is less than a threshold of the remaining storage space. When the first condition includes that a set operation instruction is received, the node 14 may start a data backup process in response to an externally input operation instruction. For example, when a user needs to clear or back up some data, an operation instruction may be input to the node 14 so that the node 14 may start the data backup process.

The first conditions may alternatively be combined arbitrarily according to implementation requirements.

In some embodiments, the node 14 maintains account data locally with the increasing number of blocks in the first blockchain. The account data records unused transaction output information in transaction information currently recorded in each block, for example, a table of unspent transaction outputs (UTXOs) in Bitcoin transactions. Each UTXO has a face value and an owner address (essentially defined by an address of a cryptographic public key). One transaction includes one or more inputs and one or more outputs. Each input includes a reference to an existing UTXO and a cryptographic signature created by a private key corresponding to the owner address. Each input includes a new UTXO. The node 14 may query, according to the locally maintained account data, for the unused transaction output information recorded in each block.

Specifically, each piece of unused transaction output information in the account data includes information such as a transaction number, a block height, and a block header hash value. Therefore, each piece of unused transaction output information may be obtained by querying the block according to the information. The unused transaction output information may include fields such as an amount of unused assets and an owner address.

In operation S302, the node 14 generates one or more pieces of transaction information according to the unused transaction output information obtained by query, the generated transaction information indicating a transaction operation based on an account address (e.g., a transaction operation that does not change an account address) to which the unused transaction output information belongs, which may be a transaction operation of transferring money to itself (or referred to as a transaction rolling operation or change operation). One piece of transaction information includes at least one piece of transaction input information and at least one piece of transaction output information. The at least one piece of transaction input information respectively references at least one piece of unused transaction output information obtained by query. Transaction output information corresponding to each piece of transaction input information includes the unused transaction output information obtained by query and referenced by the transaction input information, to represent the transaction operation of transferring money to itself. Herein, the node 14 may generate one piece of transaction information according to a plurality of pieces of unused transaction output information, which may alternatively generate more than one piece of transaction information according to implementation requirements. For example, if five pieces of unused transaction output information are obtained by query, one piece of transaction information may be generated, which includes five transaction operation records (five sets of transaction input information and transaction output information). The five transaction operation records respectively describe transaction rolling operations for the five pieces of unused transaction output information. Alternatively, another number of pieces of transaction information may be generated. Each piece of transaction information includes one or more transaction operation records. The transaction information includes a total of five transaction operation records to describe the transaction rolling operations for the five pieces of unused transaction output information.

Figure 5:
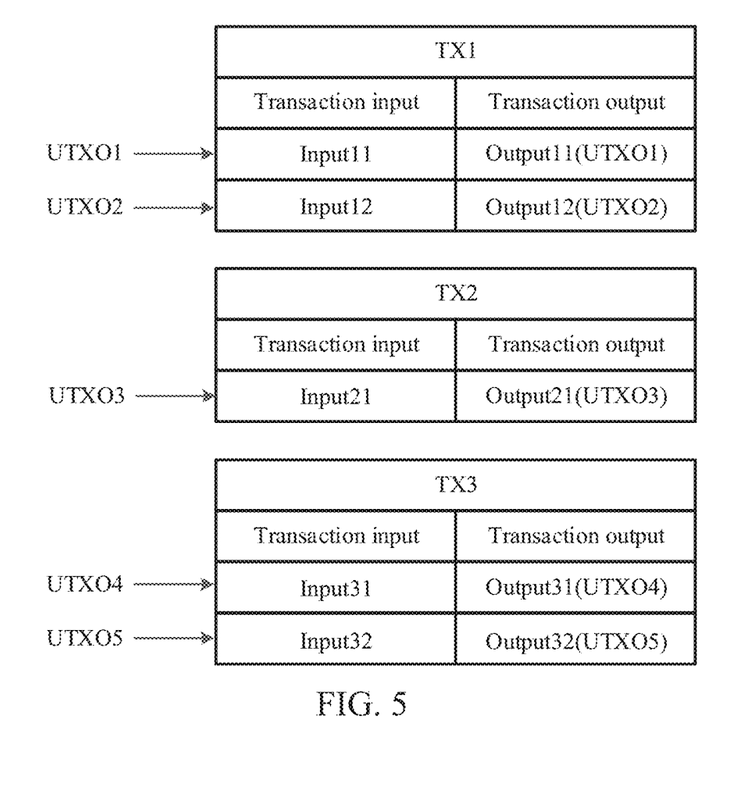
FIG. 5 is a diagram of examples of transaction information generated according to an embodiment of the disclosure.

As shown in FIG. 5, for example, the unused transaction output information obtained by query includes UTXO1 to UTXO5, and three pieces of transaction information TX1 to TX3 may be generated. TX1 includes two pieces of transaction input information Input11 and Input12 that respectively reference UTXO1 and UTXO2. Input11 and Input12 correspond to transaction output information Output11 and Output12, respectively. Output11 includes UTXO1, and Output12 includes UTXO2, that is, in terms of quantity and address, Output1 is the same as UTXO1, and Output12 is the same as UTXO2. TX2 includes transaction input information Input21 that references UTXO3, Input21 corresponds to transaction output information Output21, Output21 includes UTXO3, and Output21 is the same as UTXO3 in terms of quantity and address. TX3 includes two pieces of transaction input information Input31 and Input32 that respectively reference UTXO4 and UTXO5. Input31 and Input32 correspond to transaction output information Output31 and Output32, respectively. In terms of quantity and address, Output31 is the same as UTXO4, and Output32 is the same as UTXO5. In this way, the amount of unused assets respectively represented by UTXO1 to UTXO5 is transferred to the owner of the assets. In other words, the transaction operations neither change ownership of the assets, nor bring substantial changes to the account data.

In some embodiments, when the node 14 generates one or more pieces of transaction information according to the unused transaction output information obtained by query, for each piece of transaction information, a value may be assigned to the number of rolling times of unused transaction output information included in the transaction information. The number of rolling times refers to the number of times of performing the transaction rolling operation on any piece of unused transaction output information.

In other words, whenever one transaction rolling operation is completed, with the generation of one or more pieces of transaction information, the node 14 sets the number of rolling times of each piece of unused transaction output information in each piece of transaction information to a value of an original value plus 1. If any piece of unused transaction output information is spent, the number of rolling times of the spent transaction output information is set to 0. In this way, by maintaining the number of rolling times of each piece of unused transaction output information, "activity" of each piece of unused transaction output information may be reflected intuitively. A higher number of rolling times indicates that a plurality of transaction rolling operations have been continuously performed on the unused transaction output information, but the unused transaction output information is still not spent. In other words, the unused transaction output information is less active. Therefore, the number of rolling times may alternatively be vividly referred to as an "age" corresponding to the unused transaction output information.

In operation S303, the node 14 records the one or more pieces of transaction information generated in operation S302 in a new block (that is, a second block) and releases the new block. The new block is recorded on a second blockchain after a consensus is reached. A specific consensus processing mechanism is not described in detail herein. In addition, the node 14 backs up the first blockchain in which the one or more blocks (the first block) queried in operation S301 is located into a storage system (such as a hard disk, a magnetic disk, or a centralized or distributed database system) connected to the node 14.

In operation S303, after performing the rolling transaction operation on the unused transaction output information in the first block, the node 14 deletes the previous first blockchain, and then maintains a new blockchain (the second blockchain). There is a correlation between the two blockchains (that is, the first and the second blockchains).

In some embodiments, a block height of the second block may follow (or correspond to) a block height of the last block in the first blockchain. For example, the first blockchain has ten blocks (with block heights being 1 to 10 respectively). After unused transaction output information is obtained from the ten blocks by query and the rolling transaction operation is performed, a new block (the second block) with a height being 11 may be generated. Then, an initial block height of the second blockchain is 11, which follows the block height 10 of the last block in the first blockchain.

In some embodiments, a block header eigenvalue of a parent block included in the second block is a block header eigenvalue of the last block in the first blockchain. For example, the first blockchain has ten blocks. After unused transaction output information is obtained by querying each of the ten blocks and the rolling transaction operation is performed, a new block (the second block) may be generated. Then, the parent block of the second block is the last block in the first blockchain, and the block header eigenvalue (such as a block header hash value) of the parent block recorded in the block header of the second block is a block header eigenvalue of the last block in the first blockchain.

In some embodiments, when backing up the first blockchain into the storage system, the node 14 records, in a local data backup table, identification information (such as a block height and a block header hash value) of each block in the backed up first blockchain and a storage address, in the storage system, of each block in the backed up first blockchain. In this way, when the node 14 needs to access any block in the backed up first blockchain, a target block may be obtained by querying the storage system by using information in the data backup table, and the target block may be restored into the node 14.

In some embodiments, the node 14 may query, in a case that transaction information of any block in the first blockchain is to be accessed after the first blockchain is deleted, the data backup table to obtain a storage address corresponding to identification information of the block, access the block in the storage system according to the storage address, and query the block according to the identification information (a transaction number, a block height, a block header hash value, and the like) of the transaction information to obtain content (an asset balance, an account address, and the like) of the transaction information.

In the foregoing embodiment, the node 14 backs up the blocks in the first blockchain, and the blocks are backed up into the hard disk, a server, or a server cluster connected to the node 14. Transaction information included in the backed up blocks is rarely used, and the blocks are rarely accessed. Due to excessively low access frequency, the blocks may be referred to as cold data. In other words, the node 14 implements a "cold backup" for the blocks.

Figure 6:
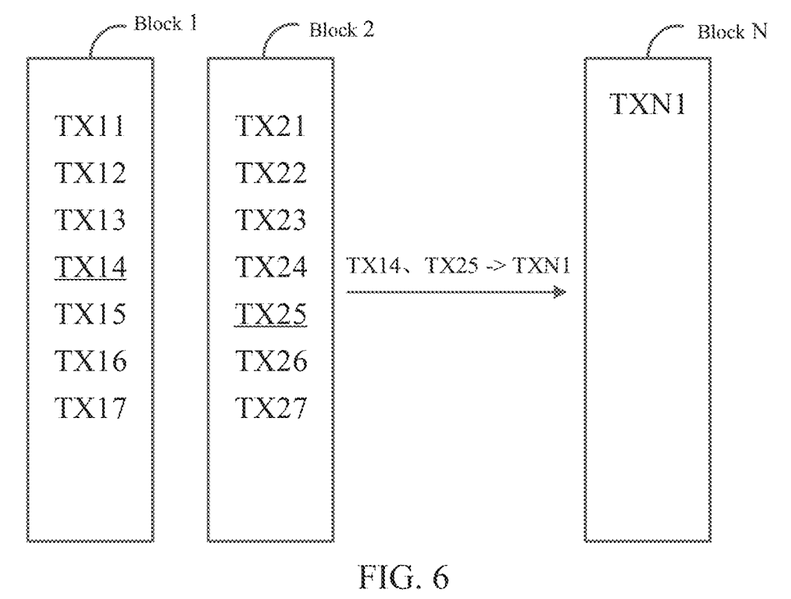
FIG. 6 is a schematic diagram of creating a block according to an embodiment of the disclosure.

FIG. 6 shows a schematic diagram of a block according to an embodiment of the disclosure. In FIG. 6, the node 14 queries blocks 1 and 2 in an old blockchain to obtain unused transaction output information TX14 and TX25, and performs transaction rolling operations respectively on TX14 and TX25 to generate a piece of transaction information TXN1. TXN1 includes two transaction records that respectively include transaction output information in TX14 and TX25. Subsequently, the node 14 creates a new blockchain, adds TXN1 to a new block N in the new blockchain, backs up the old blockchain into the storage system in a cold backup manner, and deletes the old blockchain including the blocks 1 and 2.

Figure 7:
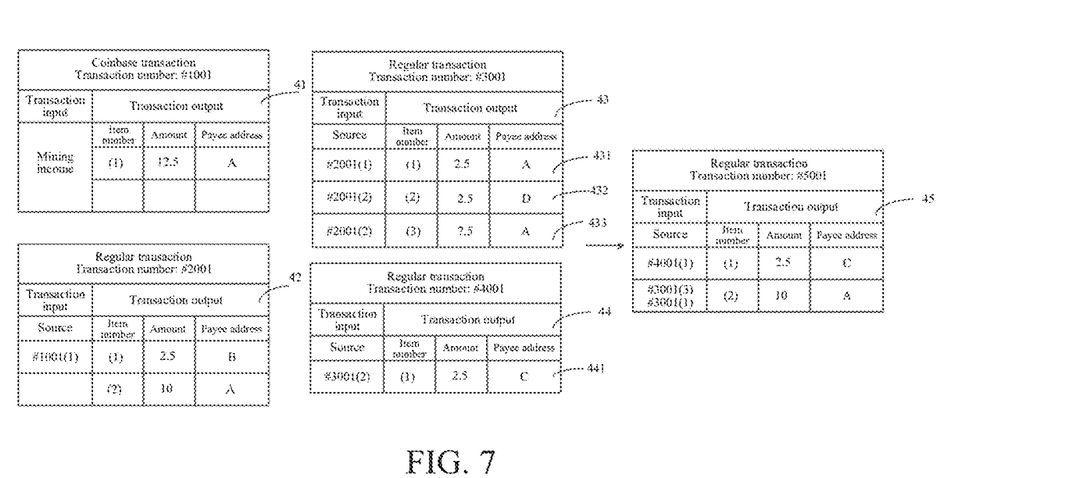
FIG. 7 is a schematic diagram of transaction information recorded in a block according to an embodiment of the disclosure.

FIG. 7 shows examples of several pieces of transaction information recorded in a block body. In FIG. 7, in transaction information with a transaction number "#1001", a transaction output 41 records that an account balance of an account "A" is 12.5; in transaction information with a transaction number "#2001", a transaction output 42 records that an account balance of the account "A" is 10, and an account balance of an account B is 2.5; in transaction information with an transaction number "#3001", a transaction output 43 records that account balances of the account "A" are 7.5 and 2.5, and an account balance of an account "D" is 2.5; and in transaction information with a transaction number "#4001", a transaction output 44 records that an account balance of an account "C" is 2.5. It can be seen that transaction output information in the transaction outputs 41 and 42 is used; (1) and (3), that is, transaction output information 431 and 433, in the transaction output 43 are not used; and (1), that is, transaction output information 441, in the transaction output 44 is not used. Then, according to the transaction output information 431, 433, and 441, transaction information with a transaction number "#5001" may be generated, whose transaction output 45 includes the three pieces of unused transaction output information 431, 433, and 441. In this way, all the transaction output information in the transaction information with the transaction numbers "#1001", "#2001", "#3001", and "#4001" is used, and is not to be used in a subsequent transaction operation. A blockchain to which the transaction output information belongs may be deleted, and the newly generated transaction information with the transaction number "#5001" may be included in a new blockchain.

In the foregoing embodiment, the node 14 performs the transaction rolling operation on unused transaction output information in all blocks, to generate new transaction information without changing ownership of assets in the unused transaction output information. In this way, all transaction output information in the blocks is used and the blocks become useless (that is, the blocks do not need to be accessed in future transaction operations). Therefore, the node 14 may back up the blocks and deleted the locally stored first blockchain, thereby saving storage space of the node 14 and ensuring accuracy of data. No impact is caused with respect to execution of a transaction operation, or normal operation of the blockchain. The technical implementation is not complex, and system performance may be substantially improved according to the disclosure.

In some embodiments, there may be a large number of pieces of unused transaction output information in the second block, and the foregoing processing does not free up much storage space. Then, in a case that a second condition is met (for example, remaining storage space is lower than a target threshold), the node 14 may further merge transaction information unused for a long time in transaction information in the second blockchain into a new third block to generate the new third block, and generate a new third blockchain and back up the new third blockchain. Furthermore, the node 14 deletes the blockchain in which the block is located, that is, the second blockchain, from the local storage, and backs up the second block accordingly. When backing up the second block, the node 14 records, in a local data backup table, identification information (such as a block height and a block header hash value) of the second block and a storage address of the second block in the storage system. In this way, when the node 14 needs to access the backed up second block, a target block may be obtained by querying the storage system by using information in data backup table, and the target block may be restored into the node 14. When a piece of unused transaction output information needs to be accessed, identification information of a block in which the unused transaction output information is located may be obtained by querying account data, so that a storage address may be obtained by querying the data backup table. Thus, the unused transaction output information in the storage system may be accessed, and the second blockchain to which the unused transaction output information belongs may further be restored into a local storage of the node 14. When a piece of unused transaction output information needs to be used, identification information of a block in which the unused transaction output information is located may be obtained by querying account data, so that a storage address may be obtained by querying the data backup table. In this way, information such as an account address and an asset balance of the unused transaction output information in the storage system may be accessed, to generate new transaction information according to the information obtained by query, and use the unused transaction output information.

Optionally, in a case that the second condition is met, if the node 14 maintains the number of rolling times for the unused transaction output information in each piece of transaction information, the node 14 may perform the operation of merging into a third block on unused transaction output information with the number of rolling times being greater than a target number of times (that is, with relatively low activity) in the second blockchain, release the third block, and make a consensus on the third block based on a consensus mechanism. When the consensus is reached, the third block is added to a third blockchain. The foregoing process is equivalent to performing one more transaction rolling operation on the unused transaction output information with relatively low activity. The unused transaction output information with relatively low activity is transferred from the second blockchain to the third blockchain, making it easy to back up the entire third blockchain to the storage system. When the backup is completed, the third blockchain may be deleted. The target number of times may be any value greater than 0, for example, the target number of times may be 3.

Through the foregoing method, although the transaction output information in the third block is still unused, that is, for an entire blockchain system, there is still a possibility of invoking the transaction output information in the third block, because the number of rolling times has exceeded the target number of times, which indicates that the possibility of invoking the transaction output information in the third block in a subsequent process is excessively low. Therefore, backing up the third block and then deleting the third block may further save the storage space of the node 14 while ensuring that a blockchain service is not affected.

In some embodiments, the node 14 may query, in a case that transaction information of any block in the second blockchain is to be accessed after the second blockchain is deleted, the data backup table to obtain a storage address corresponding to identification information of the block, access the block in the storage system according to the storage address, and query the block according to the identification information of the transaction information to obtain content (such as an asset balance and an account address) of the transaction information.

It would be understood that by using the foregoing technical solutions, storage space of a blockchain node may be saved, and utilization of storage resources may be substantially improved. Unused transaction output information may be rolled out of an existing block without changing ownership of assets, so that a cold backup may be performed on each block formed of used transaction output information, and a blockchain in which the block is located may be deleted from the blockchain node. In this way, limited storage space may be fully used for storing the unused transaction output information that is more valuable for current blockchain operation, thereby improving performance of the blockchain system. The foregoing technical solutions are also easy to be applied to the blockchain node, and have strong and wide implementability and applicability.

Figure 8:
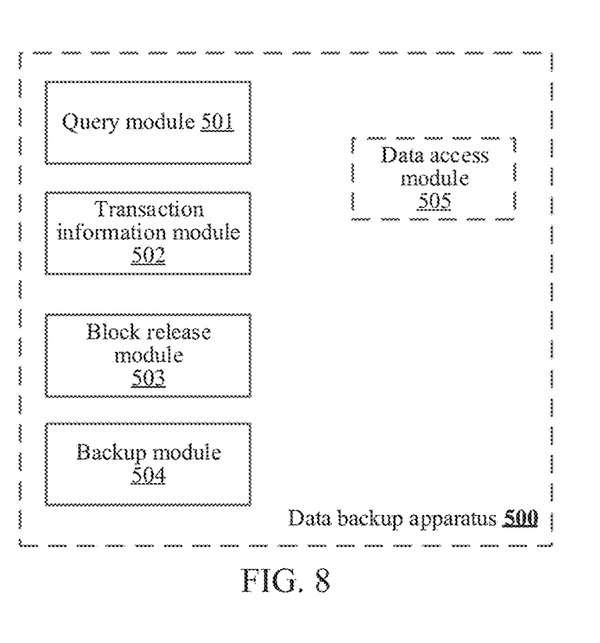
FIG. 8 is a schematic diagram of an apparatus according to an embodiment of the disclosure.

Based on the foregoing method embodiments provided in the disclosure, the embodiments of the disclosure further provide a data backup apparatus. The apparatus may be applied to the blockchain node 14. As shown in FIG. 8, a data backup apparatus 500 includes: a query module 501, configured to query a first block of a first blockchain to obtain unused transaction output information in a case that a first condition is met, the first block being each block of all blocks in the first blockchain;

a transaction information module 502, configured to generate transaction information according to the unused transaction output information obtained by query, the transaction information indicating a transaction operation that does not change an account address to which the unused transaction output information belongs;

a block release module 503, configured to record the generated transaction information in a second block and release the second block, and record the second block on which a consensus is reached on a second blockchain; and a backup module 504, configured to back up the first blockchain into a storage system, and delete the first blockchain.

In some embodiments, the backup module 504 records, in a data backup table in a process of backing up the first blockchain into the storage system, identification information of each block in the first blockchain and a storage address of each block in the storage system. The apparatus 500 further includes: a data access module 505, configured to query, in a case that any block in the first blockchain is to be accessed after the first blockchain is deleted, the data backup table to obtain a storage address corresponding to identification information of the block, and access the block in the storage system according to the storage address.

In some embodiments, the data access module 505 queries, in a case that transaction information of any block in the first blockchain is to be accessed after the first blockchain is deleted, the data backup table for a storage address corresponding to identification information of the block, accesses the block in the storage system according to the storage address, and queries the block according to identification information of the transaction information to obtain content of the transaction information.

The function implementation principles of the foregoing modules are described in detail above, and are not repeated herein.

In some embodiments, the data backup apparatus 500 may run on a computing device and be loaded in a memory of the computing device. The computing device may include one or more memories and one or more processors, the one or more memories storing a machine-readable instruction, the machine-readable instruction being loaded and executed by the one or more processors to implement the following operations:

querying a first block of a first blockchain for unused transaction output information in a case that a first condition is met, the first block being each block of all blocks in the first blockchain;

generating transaction information according to the unused transaction output information obtained by query, the transaction information indicating a transaction operation that does not change an account address to which the unused transaction output information belongs;

recording the transaction information in a second block and releasing the second block, and recording the second block on which a consensus is reached on a second blockchain; and backing up the first blockchain into a storage system, and deleting the first blockchain.

Optionally, the first condition includes that a block height of the first blockchain conforms to (or reach) a preset value.

Optionally, the first condition includes that remaining storage space is lower than a first threshold; or a set time interval is reached; or a set operation instruction is received.

Optionally, a block height of the second block follows a block height of the last block in the first blockchain.

Optionally, a block header eigenvalue of a parent block included in the second block is a block header eigenvalue of the last block in the first blockchain.

Optionally, the one or more processors are configured to perform the following operation:

recording, in a data backup table, identification information of each block in the first blockchain and a storage address of each block in the storage system.

Optionally, the one or more processors are configured to perform the following operation:

querying, in a case that any block in the first blockchain is to be accessed after the first blockchain is deleted, the data backup table for a storage address corresponding to identification information of the block, and accessing the block in the storage system according to the storage address; or querying, in a case that transaction information of any block in the first blockchain is to be accessed after the first blockchain is deleted, the data backup table for a storage address corresponding to identification information of the block, accessing the block in the storage system according to the storage address, and querying the block according to identification information of the transaction information to obtain content of the transaction information.

Figure 9:
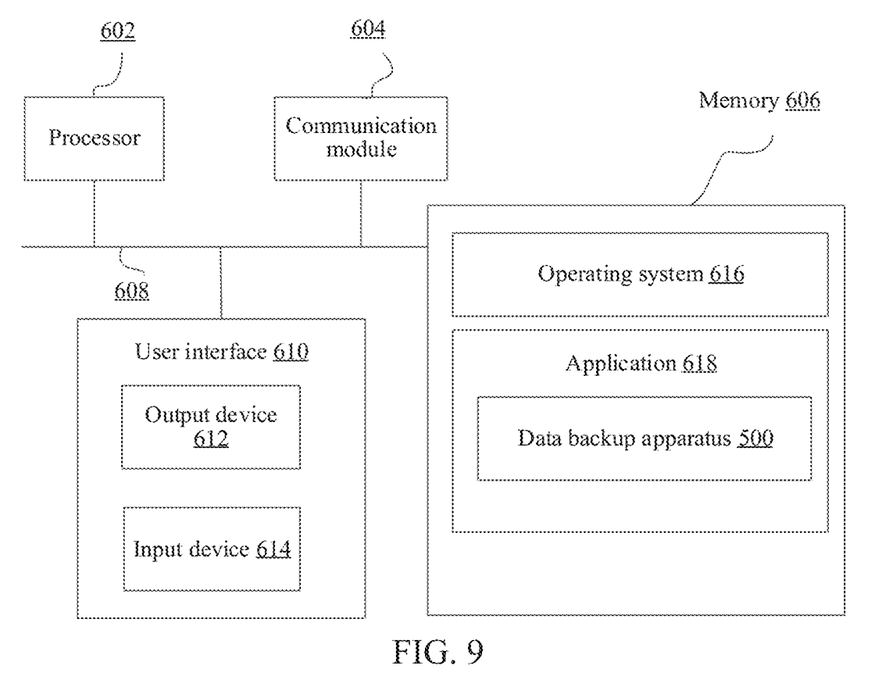
FIG. 9 is a schematic diagram of a computing device according to an embodiment of the disclosure.

FIG. 9 shows a structural diagram of composition of a computing device in which the data backup apparatus 500 is located. As shown in FIG. 9, the computing device includes one or more processors (e.g., central processing units (CPUs)) 602, a communication module 604, a memory 606, a UI 610, and a communication bus 608 for interconnecting such components.

The processor 602 may receive and transmit data by using the communication module 604 to implement network communication and/or local communication.

The UI 610 includes one or more output devices 612 that include one or more speakers and/or one or more visual displays. The UI 610 also include one or more input devices 614 that include, for example, a keyboard, a mouse, a voice command input unit, a microphone, a touchscreen display, a touch-sensitive panel, a gesture capture camera, an input button, and a control.

The memory 606 may be a high-speed random access memory such as a DRAM, an SRAM, a DDR RAM, or other random access solid-state memory devices; or a non-volatile memory such as one or more magnetic disk storage devices, optical disc storage devices, flash memory devices, or other non-volatile solid-state memory devices.

The memory 606 stores a set of instructions executable by the processor 602, including:

an operating system 616, including a program used for processing various basic system services and executing a hardware-related task; and an application 618, including various application programs for implementing processing procedures in the foregoing embodiments, for example, including the apparatus 500 shown in FIG. 8. In some embodiments, the apparatus 500 may include some or all of the modules 501 to 505 shown in FIG. 8, and each of the modules 501 to 505 may store a machine-executable instruction. The processor 602 may implement functions of the modules 501 to 505 by executing the machine-executable instructions of the modules 501 to 505 in the memory 606.

Not all of the operations and modules in the foregoing processes and structural diagrams are necessary, and some operations or modules may be neglected according to actual requirements. An execution sequence of the operations is not fixed and may be adjusted according to requirements. Division of the modules is merely functional division for ease of description. During actual implementation, one module may be implemented separately by a plurality of modules, and functions of the plurality of modules may alternatively be implemented by the same module. The modules may be located in the same device, and may further be located in different devices.

Hardware module in the embodiments may be implemented in a hardware manner or in a hardware platform combining with software manner. The software includes a machine-readable instruction, stored in a non-volatile storage medium. Therefore, the embodiments may alternatively be implemented in the form of a software product.

In the embodiments, hardware may be implemented by hardware of dedicated hardware or hardware executing the machine-readable instruction. For example, the hardware may be a specifically designed permanent circuit or logical device (for example, a dedicated processor, such as an FPGA or an ASIC) for completing a specific operation. The hardware may alternatively include a programmable logical device or circuit (for example, including a general processor or another programmable processor) configured temporarily by software and configured to perform a specific operation.

In addition, each embodiment of the disclosure may be implemented by a data processing program executed by a data processing device such as a computer. Apparently, the data processing program constitutes the disclosure. In addition, generally, a data processing program stored in a storage medium is directly read from the storage medium for execution or the program is installed on or replicated to a storage device (such as a hard disk or memory) of a data processing device for execution. Therefore, such a storage medium also constitutes the disclosure. The disclosure further provides a non-volatile storage medium storing a data processing program. The data processing program may be used for performing any one of the foregoing method embodiments of the disclosure.

In the foregoing process, the storage medium may store a machine-readable instruction, the machine-readable instruction, when executed by one or more processors, causing the one or more processors to implement the following operations:

querying a first block of a first blockchain for unused transaction output information in a case that a first condition is met, the first block being each block of all blocks in the first blockchain;

generating transaction information according to the unused transaction output information obtained by query, the transaction information indicating a transaction operation that does not change an account address to which the unused transaction output information belongs;

recording the transaction information in a second block and releasing the second block, and recording the second block on which a consensus is reached on a second blockchain; and backing up the first blockchain into a storage system, and deleting the first blockchain.

Optionally, the first condition includes that a block height of the first blockchain conforms to (or reach) a preset value; or remaining storage space is lower than a first threshold; or a set time interval is reached; or a set operation instruction is received.

Optionally, a block height of the second block follows a block height of the last block in the first blockchain.

Optionally, a block header eigenvalue of a parent block included in the second block is a block header eigenvalue of the last block in the first blockchain.

Optionally, the one or more processors are configured to perform the following operation:

recording, in a data backup table, identification information of each block in the first blockchain and a storage address of each block in the storage system.

Optionally, the one or more processors are configured to perform the following operation:

querying, in a case that any block in the first blockchain is to be accessed after the first blockchain is deleted, the data backup table for a storage address corresponding to identification information of the block, and accessing the block in the storage system according to the storage address; or querying, in a case that transaction information of any block in the first blockchain is to be accessed after the first blockchain is deleted, the data backup table for a storage address corresponding to identification information of the block, accessing the block in the storage system according to the storage address, and querying the block according to identification information of the transaction information to obtain content of the transaction information.

The machine-readable instruction corresponding to the modules in FIG. 8 may provide an operating system and the like operating on the computer and the like to complete some or all of the operations described herein. A computer-readable medium may include a computer storage medium and a communications medium. The computer storage medium includes volatile and non-volatile media, and removable and non-removable media implemented by using any method or technology and configured to store information such as a computer-readable instruction, a data structure, a program module, or other data. A non-volatile computer-readable storage medium may be a memory disposed in an extension board inserted into the computer or a memory disposed in an extension unit connected to the computer. A CPU and the like installed on the extension board or the extension unit may perform some or all actual operations according to the instructions.

The volatile and non-volatile computer-readable storage media may include a RAM, a ROM, an EPROM, an EEPROM, a flash memory, a floppy disk, a hard disk, a magneto-optical disk, an optical disk (such as CD-ROM, CD-R, CD-RW, DVD-ROM, DVD-RAM, DVD-RW, and DVD+RW), a tape, a non-volatile memory card and the like. Alternatively, a program code may be downloaded from a server computer by a communication network.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While the disclosure has been particularly shown and described with reference to example embodiments thereof, it will be understood that various changes in form and details may be made therein without departing from the spirit and scope of the following claims.

What is claimed is:

1. A data backup method, performed by a terminal, the method comprising:
   querying a first block of a first blockchain for unused transaction output information based on a first condition being met, the first block comprising each block of all blocks included in the first blockchain;
   generating transaction information according to the unused transaction output information obtained based on the querying, the transaction information indicating a transaction operation based on an account address to which the unused transaction output information belongs;
   recording the transaction information in a second block and releasing the second block, and recording the second block on which a consensus is reached on a second blockchain; and
   backing up the first blockchain into a storage system, and deleting the first blockchain.

2. The method according to claim 1, wherein the first condition comprises a condition that a block height of the first blockchain reaches a preset value.

3. The method according to claim 1, wherein the first condition comprises at least one of a condition that a remaining storage space is lower than a first threshold, a condition that a set time interval is reached, or a condition that a set operation instruction is received.

4. The method according to claim 1, wherein a block height of the second block corresponds to a block height of a last block in the first blockchain.

5. The method according to claim 1, wherein a block header eigenvalue of a parent block included in the second block is a block header eigenvalue of a last block in the first blockchain.

6. The method according to claim 1, wherein the backing up comprises:
   recording, in a data backup table, identification information of each block in the first blockchain and a storage address of each block in the storage system.

7. The method according to claim 6, further comprising, after the first blockchain is deleted:
   querying the data backup table for a storage address corresponding to identification information of a block included in the first blockchain, and accessing the block in the storage system according to the storage address.

8. A non-transitory computer-readable storage medium storing instructions, the instructions, when executed by one or more processors, causing at least one of the one or more processors to perform:
   querying a first block of a first blockchain for unused transaction output information based on a first condition being met, the first block comprising each block of all blocks included in the first blockchain;
   generating transaction information according to the unused transaction output information obtained based on the querying, the transaction information indicating a transaction operation based on an account address to which the unused transaction output information belongs;
   recording the transaction information in a second block and releasing the second block, and recording the second block on which a consensus is reached on a second blockchain; and
   backing up the first blockchain into a storage system, and deleting the first blockchain.

9. The storage medium according to claim 8, wherein the first condition comprises at least one of a condition that a block height of the first blockchain reaches a preset value; a condition that a remaining storage space is lower than a first threshold; a condition that a set time interval is reached; or a condition that a set operation instruction is received.

10. The storage medium according to claim 8, wherein a block height of the second block corresponds to a block height of a last block in the first blockchain.

11. The storage medium according to claim 8, wherein a block header eigenvalue of a parent block included in the second block is a block header eigenvalue of a last block in the first blockchain.

12. The storage medium according to claim 8, wherein the instructions are configured to cause at least one of the one or more processors to perform the backing up by recording, in a data backup table, identification information of each block in the first blockchain and a storage address of each block in the storage system.

13. The storage medium according to claim 12, wherein the instructions are further configured to cause at least one of the one or more processors to perform:
   after the first blockchain is deleted, querying the data backup table for a storage address corresponding to identification information of a block included in the first blockchain, and accessing the block in the storage system according to the storage address.

14. A computing device comprising:
   at least one memory configured to store program code; and
   at least one processor configured to read the program code and operate as instructed by the program code, the program code comprising:
      first querying code configured to cause at least one of the at least one processor to query a first block of a first blockchain for unused transaction output information based on a first condition being met, the first block comprising each block of all blocks included in the first blockchain;
      generating code configured to cause at least one of the at least one processor to generate transaction information according to the unused transaction output information obtained based on querying of the first querying code, the transaction information indicating a transaction operation based on an account address to which the unused transaction output information belongs;
      first recording code configured to cause at least one of the at least one processor to record the transaction information in a second block and releasing the second block, and recording the second block on which a consensus is reached on a second blockchain; and
      backup code configured to cause at least one of the at least one processor to back up the first blockchain into a storage system, and deleting the first blockchain.

15. The computing device according to claim 14, wherein the first condition comprises a condition that a block height of the first blockchain reaches a preset value.

16. The computing device according to claim 14, wherein the first condition comprises at least one of a condition that remaining storage space is lower than a first threshold; a condition that a set time interval is reached; or a condition that a set operation instruction is received.

17. The computing device according to claim 14, wherein a block height of the second block corresponds to a block height of a last block in the first blockchain.

18. The computing device according to claim 14, wherein a block header eigenvalue of a parent block included in the second block is a block header eigenvalue of a last block in the first blockchain.

19. The computing device according to claim 14, wherein the program code further comprises:
   second recording code configured to cause at least one of the at least one processor to record, in a data backup table, identification information of each block in the first blockchain and a storage address of each block in the storage system.

20. The computing device according to claim 19, wherein the program code further comprises:
   second querying code configured to cause at least one of the at least one processor to, after the first blockchain is deleted, query the data backup table for a storage address corresponding to identification information of a block included in the first blockchain, and access the block in the storage system according to the storage address.

\* \* \* \* \*